Jan. 22, 1935.  W. C. WEBER  1,988,883
GLASS WORKING APPARATUS
Filed Dec. 5, 1932  2 Sheets-Sheet 1
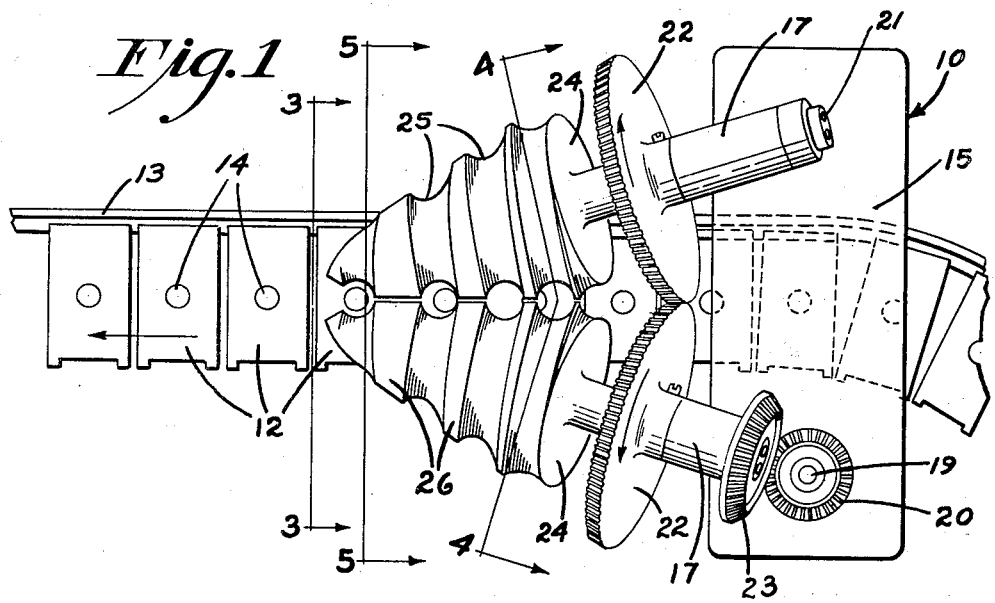
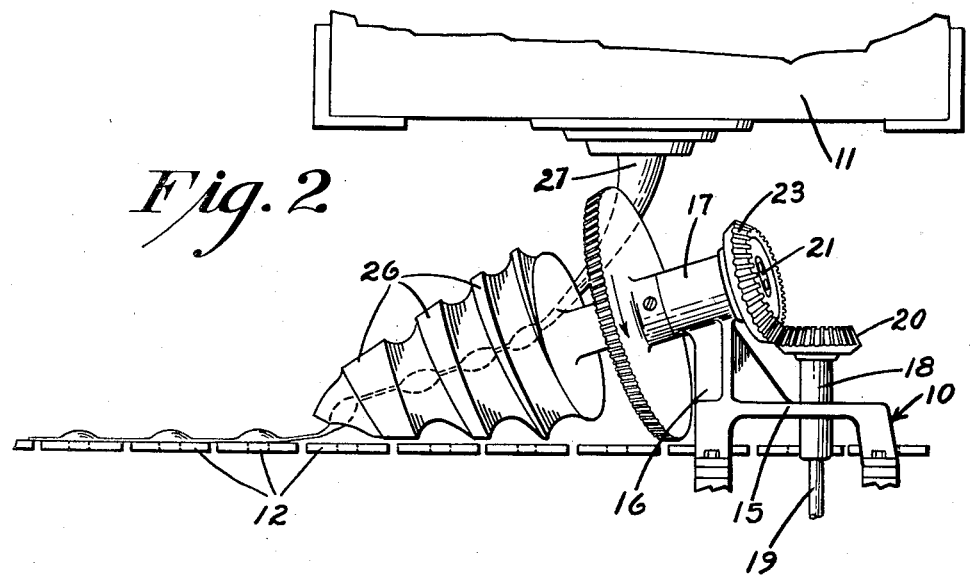
INVENTOR.
WALTER C. WEBER
BY Dorsey & Cole
ATTORNEYS.

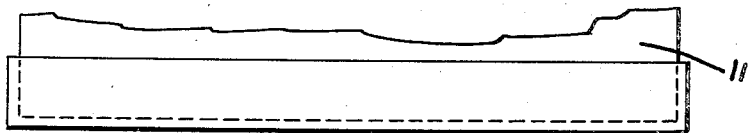
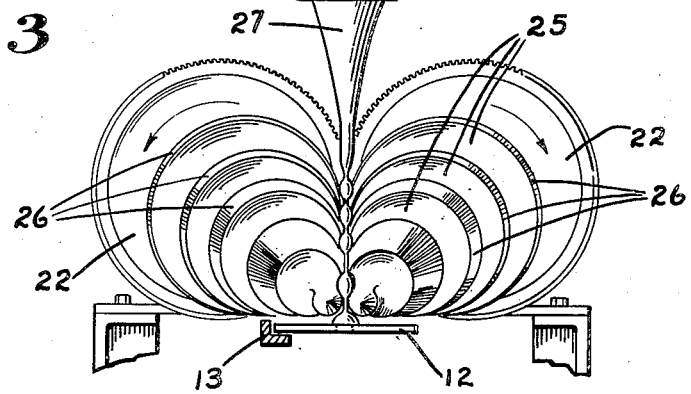
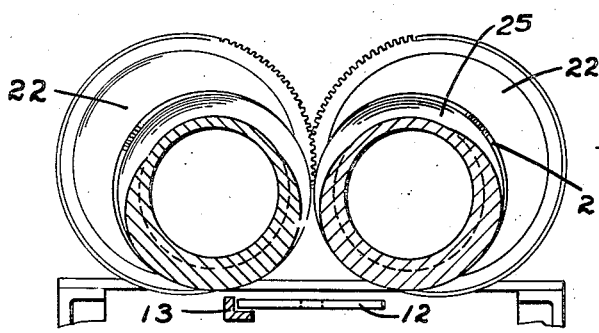
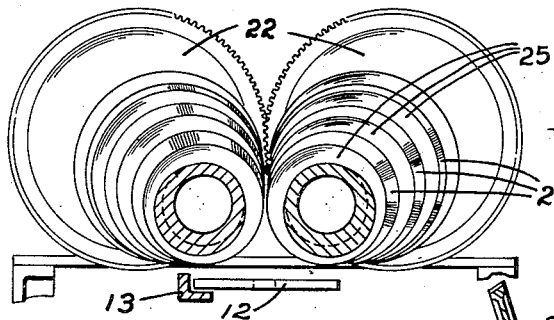
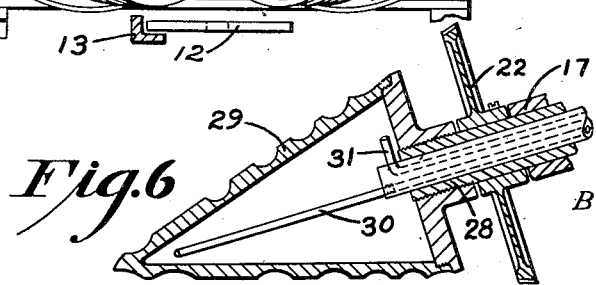

Patented Jan. 22, 1935

1,988,883

UNITED STATES PATENT OFFICE 1,988,883

GLASS WORKING APPARATUS

Walter Carl Weber, Corning, N. Y., assignor to Corning Glass Works, Corning, N. Y., a corporation of New York Application December 5, 1932, Serial No. 645,787

10 Claims. (Cl. 49—33)

This invention relates to glass working apparatus and more particularly to a ribbon former applicable to glass working machines such as that disclosed in United States Patent No. 1,790,397 issued to W. J. Woods and David E. Gray on the 27th day of January, 1931.

The object of the present invention is to form a ribbon of glass with a plurality of spaced bosses thereon.

Another object is to avoid chilling the bosses prior to their deposit on the ribbon conveyor.

Still another object is to reduce to a minimum the amount of glass in the ribbon between the bosses.

The above and other objects may be attained by employing my invention which embodies among its features depositing a stream of glass upon a pair of rolls having mating spiral grooves, the pitch of which increases as the free ends of the rolls are approached, advancing the glass toward the free ends of the rolls by rotating them and elongating the spaces between the bosses by the increased pitch of the spiral grooves.

In the drawings:

Fig. 1 is a plan view of a ribbon apparatus constructed in accordance with my invention;

Fig. 2 is a side view of Fig. 1;

Fig. 3 is an end view of Fig. 1;

Fig. 4 is a transverse sectional view taken on the line 4—4 of Fig. 1;

Fig. 5 is a transverse sectional view taken on the line 5—5 of Fig. 1; and

Fig. 6 is a longitudinal sectional view through a modified form of forming roll.

Referring to the drawings in detail, the ribbon former designated generally 10 is supported below a feeder bowl 11 of a glass furnace and above a ribbon conveyor which comprises a plurality of orifice plates 12. These plates move along a track rail 13 in the direction of the arrow in Fig. 1 and are provided with centrally disposed openings 14 through which the glass deposited on the plates sags as disclosed in the patent above referred to.

The ribbon former 10 comprises a bed plate 15 which is secured to the frame of the machine and carries standards 16 which support at their upper ends bearings 17. Extending upwardly from the bed plate 15 is a tubular boss 18 which forms a bearing for a drive shaft 19 carrying at its upper end a drive pinion 20.

Rotatably supported in the bearings 17 are shafts 21 secured to which are gears 22 which mesh with each other so that when one shaft is rotated, the other will also rotate. A bevel pinion 23 is secured to the end of one of the shafts 21 opposite that to which the gear 22 is secured and this pinion 23 meshes with the pinion 20 so that when the drive shaft 19 is rotated both of the shafts 21 will move in unison.

Secured to the ends of the shafts 21 adjacent the gears 22 are forming rolls 24 which in the present instance are of conical shape. Formed in the outer sides of these rolls 24 are spiral grooves 25, the distance between the convolutions of which increase as the ends opposite those carried by shafts 21 are approached. This then forms on each roll a spiral rib 26 which starts near the free end of the roll 24 with a relative broad flat face which gradually diminishes in width as the end of the roll which is attached to shaft 21 is approached until it terminates in a thin sharp fin. As shown in Figs. 1 and 2, the spiral ribs 26 of the rolls 22 run against each other to form a support for a stream of glass 27 as it issues from the forehearth 11 while the walls of the grooves 25 form pockets or passes between the rolls in which the glass bosses are allowed to form.

In the preferred embodiment of my invention, that is, that shown in the accompanying drawings, the bearings 17 are inclined downwardly and inwardly so that the shafts are likewise inclined in such a manner with the result that their axes intersect each other at or about the point where they intersect the plane of the ribbon conveyor. Consequently, the forming rolls 24 take the form of cones and hence the ribbon formed by the device can be gently deposited upon the ribbon conveyor. The cylindrical form, however, is capable of use and hence I do not wish to be limited to the specific shape of rolls or disposition of their supporting shafts.

In the modified form of forming rolls shown in Fig. 6, the roll supporting shaft 28 is preferably tubular in form and the roll 29 is hollow. This construction is adapted so that a cooling fluid may be circulated through the roll by means of conduits 30 and 31 which enter the roll through the tubular shaft and are connected at their opposite ends to a suitable supply of cooling fluid (not shown). In this manner, the rolls may be kept at the most satisfactory working temperature.

In operation, glass flowing from the orifice in the forehearth 11 is deposited on the rolls at the point where the spiral ribs 26 are the thinnest. As the rolls rotate, it will be seen that the glass which fails to contact with the rolls by reason of its being between the ribs will be advanced and its speed of advance will be increased as the free ends of the rolls are approached. This has the effect of stretching that glass which is supported on the contacting faces of the spiral ribs and reducing its cross-section to a point where that portion of the glass which is not formed into ware is reduced to a minimum.

While in the foregoing, there has been shown and described the preferred embodiment of my invention, it is to be understood that minor changes in the construction, combination and arrangement of parts may be resorted to without departing from the spirit and scope of the invention as claimed.

What I claim is:

1. The method of forming a ribbon of plastic glass having spaced bosses thereon which includes reducing the cross-section of a stream of plastic glass at spaced intervals and elongating the reduced portions at a progressively increasing rate of speed.

2. The method of forming a ribbon of plastic glass having spaced bosses thereon which includes reducing the cross-section of a stream of plastic glass at spaced intervals and advancing the unreduced portions at a progressively increasing rate of speed.

3. The method of forming a ribbon of plastic glass having spaced bosses thereon, which includes depositing a stream of plastic glass on a forming roll, reducing the cross-section of the stream at spaced intervals and advancing the unreduced portions of the stream at a progressively increasing rate of speed.

4. The method of forming a ribbon of plastic glass having spaced bosses thereon which includes depositing a stream of plastic glass on a pair of forming rolls, reducing the cross-section of the glass stream at spaced intervals and advancing the unreduced portions of the stream at a progressively increasing rate of speed.

5. The method of forming a ribbon of plastic glass having spaced bosses thereon which includes supporting a stream of plastic glass at spaced intervals and advancing the unsupported portions of the stream at a progressively increasing rate of speed.

6. In a glass working machine a glass shaping and feeding device which includes a pair of rolls mounted for peripheral engagement, peripheral spiral grooves on said rolls, the convolutions of said grooves increasing in pitch as the ends of the rolls are approached and means to cause the rolls to move in unison.

7. In a glass working machine a glass shaping and feeding device which includes a pair of rolls mounted for peripheral engagement, and spiral peripheral ribs of progressively increasing width on said rolls.

8. In a glass working machine a glass shaping and feeding device which includes a pair of rolls mounted for peripheral engagement, spiral peripheral ribs of progressively increasing width on said rolls, and means to cause the rolls to move in unison.

9. In a glass working machine a glass shaping and feeding device which includes a pair of cone-shaped rolls mounted for peripheral engagement, said rolls having peripheral spiral grooves the convolutions of which increase in pitch as the reduced ends of the rolls are approached and means to cause the rolls to move in unison.

10. In a glass working machine a glass shaping and feeding device which includes a pair of cone-shaped rolls mounted for peripheral engagement, said rolls carrying spiral peripheral ribs of progressively increasing width and means to cause the rolls to move in unison.

WALTER CARL WEBER.